United States Patent [19]

Pernpeintner et al.

[11] Patent Number: 5,005,549
[45] Date of Patent: Apr. 9, 1991

[54] METHOD AND APPARATUS FOR RECOGNIZING A FAULTY COMBUSTION IN AN INTERNAL COMBUSTION ENGINE

[75] Inventors: Alfons Pernpeintner, Langquaid; Udo Frinzel, Oberkotzau, both of Fed. Rep. of Germany

[73] Assignee: Siemens Aktiengesellschaft, Berlin and Munich, Fed. Rep. of Germany

[21] Appl. No.: 559,384

[22] Filed: Jul. 23, 1990

Related U.S. Application Data

[63] Continuation of Ser. No. 305,923, Feb. 3, 1989, abandoned.

[30] Foreign Application Priority Data

Feb. 4, 1988 [DE] Fed. Rep. of Germany ....... 3803337

[51] Int. Cl.$^5$ .................................................. F02P 5/14
[52] U.S. Cl. ..................................... 123/479; 123/435; 123/417; 123/425
[58] Field of Search ............... 123/425, 416, 417, 422, 123/479; 73/35; 364/431.09

[56] References Cited

U.S. PATENT DOCUMENTS

| | | | |
|---|---|---|---|
| 4,331,117 | 5/1982 | Ginsburgh | 123/425 |
| 4,388,902 | 6/1983 | Latapic | 123/425 |
| 4,430,979 | 2/1984 | Shikata | 123/479 |
| 4,541,386 | 9/1985 | Kishi et al. | 123/479 |
| 4,582,034 | 4/1986 | Iwata | 123/425 |
| 4,612,901 | 9/1986 | Iwata et al. | 123/425 |
| 4,621,602 | 11/1986 | Furuyama | 123/425 |
| 4,651,698 | 3/1987 | McDermott et al. | 123/425 |
| 4,653,789 | 4/1987 | Morita | 123/422 |
| 4,696,277 | 9/1987 | Katayama | 123/479 |
| 4,700,677 | 10/1987 | Bonitz et al. | 123/425 |
| 4,805,576 | 2/1989 | Abe et al. | 123/479 |
| 4,850,325 | 7/1989 | Abe et al. | 123/479 |
| 4,886,029 | 12/1989 | Lill et al. | 123/479 |
| 4,928,228 | 5/1990 | Fujimoto et al. | 364/431.09 |
| 4,966,092 | 10/1990 | Sasaki et al. | 123/479 |

FOREIGN PATENT DOCUMENTS

| | | | |
|---|---|---|---|
| 3419727 | 11/1985 | Fed. Rep. of Germany | 123/425 |
| 3615547 | 11/1986 | Fed. Rep. of Germany | 123/425 |
| 2472091 | 6/1981 | France | 123/425 |
| 2476748 | 8/1981 | France | 123/425 |
| 0212766 | 9/1988 | Japan | 123/425 |
| 0212767 | 9/1988 | Japan | 123/425 |
| 0212768 | 9/1988 | Japan | 123/425 |

*Primary Examiner*—Raymond A. Nelli
*Attorney, Agent, or Firm*—Hill, Van Santen, Steadman & Simpson

[57] ABSTRACT

A sensor signal from a sensor which measures vibration of an internal combustion engine is filtered by a filter to provide characteristic frequency components for a normal combustion. When the filter signal remains below a reference value, a fault signal is output to indicate a faulty combustion. The filter may be switchable bandpass filters whose output signals are measured for knocking of the motor or for normal combustion. A programmed control unit evaluates the output signals from the filter within a characteristic time segment.

15 Claims, 3 Drawing Sheets

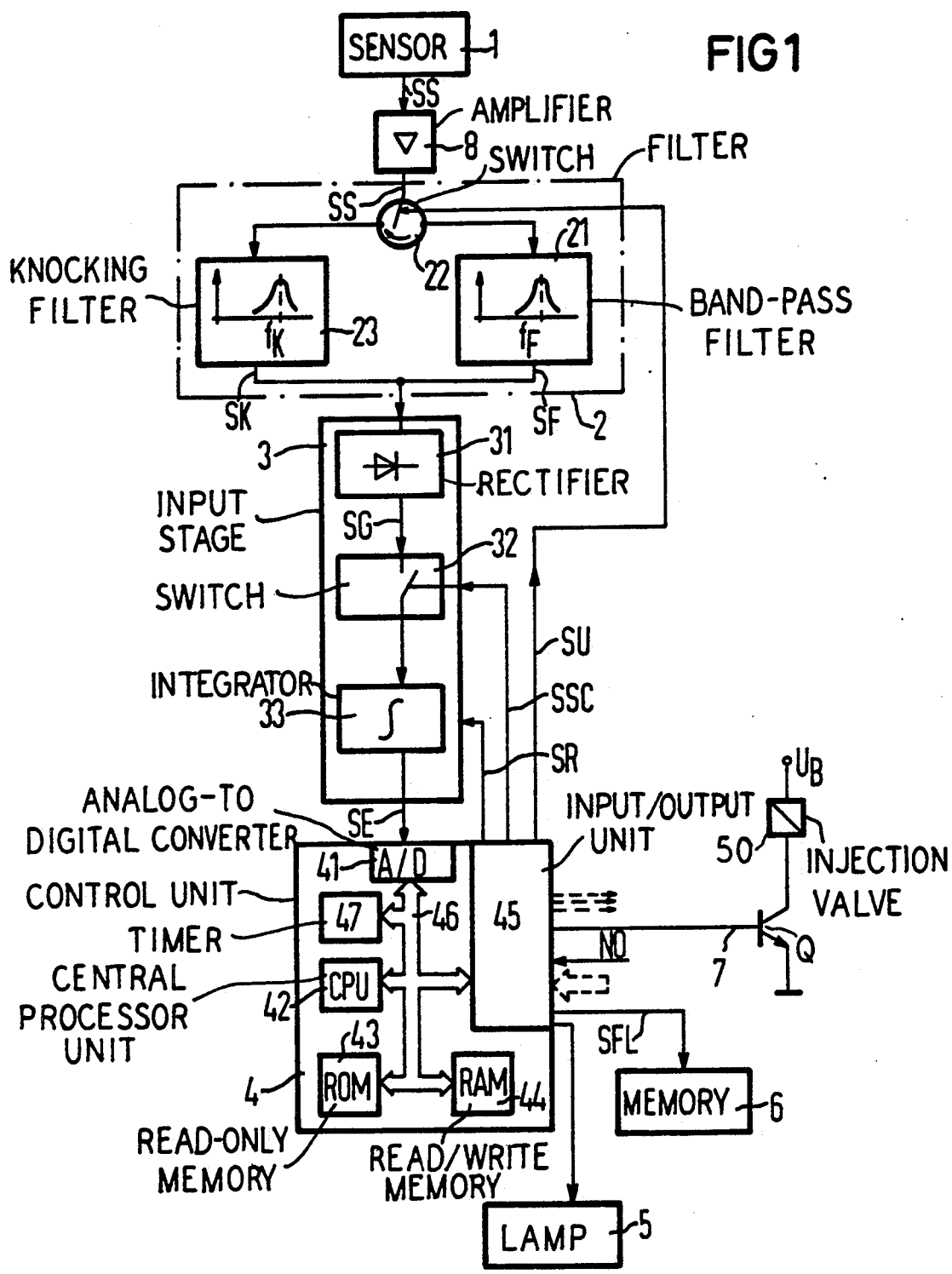

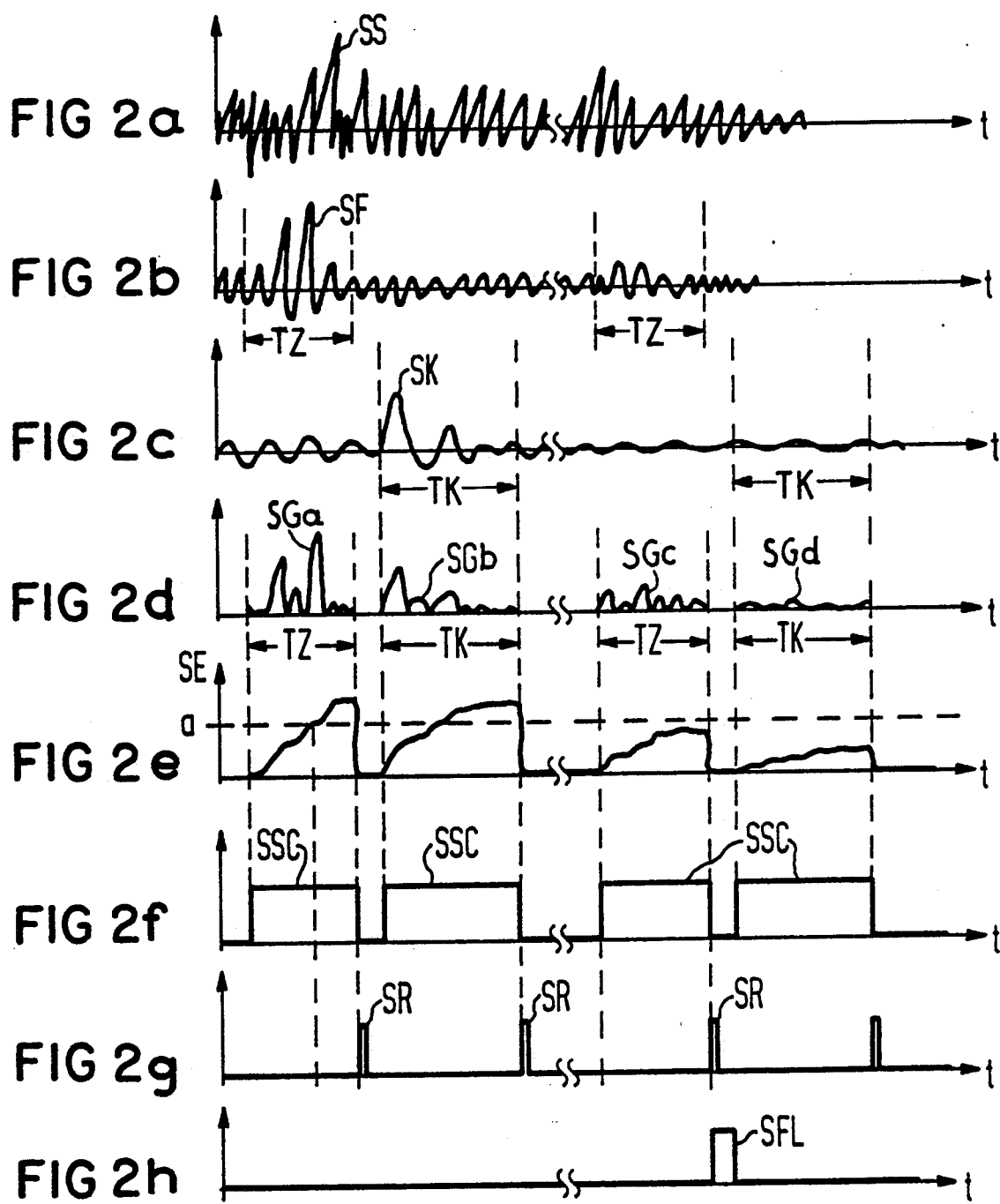

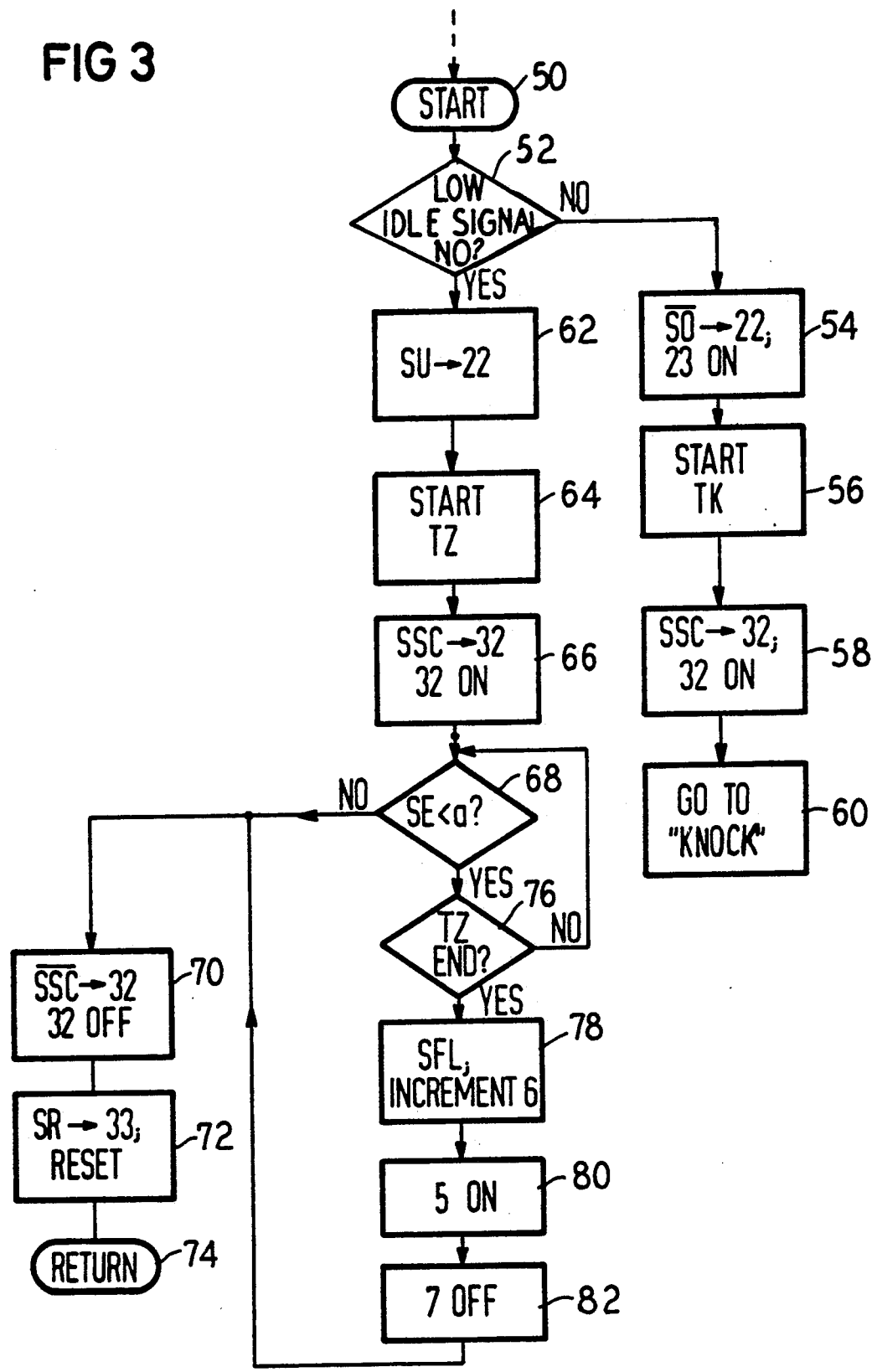

METHOD AND APPARATUS FOR RECOGNIZING A FAULTY COMBUSTION IN AN INTERNAL COMBUSTION ENGINE

This is a continuation of application Ser. No. 305,923 filed Feb. 3, 1989, now abandoned.

BACKGROUND OF THE INVENTION

1. Field of the Invention

The present invention is directed generally to a method and apparatus for recognizing faulty combustion in an internal combustion engine whereby at least one sensor signal is measured for vibration of the engine.

2. Description of the Related Art

When a faulty combustion in an internal combustion engine is caused, for example, by malfunctions in injection, ignition, or compression, the effected cylinder of the internal combustion engine can be washed out or flooded given the absence of ignition or the lack of compression but with continued injection of fuel. When this washing or flooding lasts for a longer time, irreparable motor damage occurs because the piston seizes. Moreover, incomplete combustion of the injected fuel leads to an increase in environmental pollution as well as to damage to the exhaust catalyst device.

SUMMARY OF THE INVENTION

It is an object of the present invention to recognize faulty combustion in an internal combustion engine. Another object is to interrupt injection of fuel into a cylinder experiencing faulty combustion to avoid engine damage. A further object is to check an identified faulty cylinder for correct combustion.

These and other objects of the invention are achieved in a method wherein a sensor signal measures the vibration of the internal combustion engine, a filter signal having at least some spectrum components which are characteristic for a normal combustion in the internal combustion engine is derived from the sensor signal, and a fault signal is identified and evaluated when the filter signal remains below a reference value despite continued ignition in the internal combustion engine.

In accordance with the invention, the vibrations of the internal combustion engine are converted, by a sensor, into a sensor signal to enable a faulty combustion to be recognized. The sensor signal has characteristic spectral components of normal combustion in addition to components, when faulty combustion is occurring, of faulty combustion. Such normal combustion spectral components are filtered out of the sensor signal and combined in a filter signal. During normal combustion, the filter signal assumes a value that lies above a defined reference value. By contrast, the value of the filter signal lies below the reference value when a faulty combustion occurs. An error signal is generated which is then further evaluated to display an indication of the faulty combustion and/or to initiate suitable countermeasures.

To avoid disturbances and misinterpretations, the filter signal is preferably taken into consideration only during a time period which is characteristic for the combustion. The time period that is established is an ignition measuring window.

To check the combustion in the internal combustion engine, checking is preferably only performed during operating conditions wherein no knocking, and particularly no high speed knocking, occurs. The apparatus for performing this method can be largely used for checking and for evaluating a knocking signal, as well, without mutual disturbance or overload of, for example, a processor used in the ignition evaluation. The filter signal is preferably evaluated during idling of the internal combustion engine.

An apparatus for implementing the method of the invention includes a single sensor for generating a sensor signal. This sensor is secured to the internal combustion engine and the output signal therefrom is capable of being checked and evaluated both for knocking as well as for regular combustion. The sensor signal is supplied to a filter which has a first band-pass filter to filter out a filter signal and has a knocking band-pass filter for filtering out a knocking signal which is characteristic of knocking in the internal combustion engine. A switchover means is provided in conjunction with the filter, the switchover means being driven by a control unit and, depending upon the signal to be detected, connecting the sensor signal through either the knocking band-pass filter or the first band-pass filter to an input stage. The switchover means can either be arranged preceding or following the band-pass filters. The first filter signal or the knocking signal is supplied through a final stage to a control unit that is preferably constructed of a program-controlled processor system. The processor system controls and executes the overall evaluation of the sensor signal.

The described functions can be performed in the central motor controller which controls the internal combustion engine or can be performed in a separate control unit that collaborates with the motor controller.

The control unit calculates a fault signal when the filter signal remains below the aforementioned reference value, indicating that a faulty combustion has occurred. The fault signal preferably drives a warning lamp for indicating the presence of a malfunction when the fault signal occurs. The warning lamp is preferably driven only when a defined plurality of faulty combustions or a lasting malfunction of one or more cylinders in the internal combustion engine has been identified during a prescribed time. A fault memory which is driven by the control unit when the control unit identifies a fault signal is preferably used for registration of fault signals as well as for later diagnosis of the internal combustion engine.

When the control unit has identified a plurality of faulty combustions for a cylinder, the control unit preferably includes means to initiate a shut-down of the injection for the effected cylinder.

Further advantageous modifications of the method include, in particular, taking the filter signal into consideration only during the ignition measuring window. The filter signal is calculated from the sensor signal and evaluated when knocking of the internal combustion engine does not occur. The filter signal is calculated preferably during idling of the internal combustion engine. In the preferred embodiment, the ignition measuring window begins at the point in time of ignition and extends over about 10 percent of the crank shaft angle.

In the apparatus for practicing the method, at least one sensor is secured to the internal combustion engine and generates or determines the sensor signal which is fed through an amplifier circuit to a band pass filter which generates a filter signal therefrom. The filter signal is transmitted to an input stage which calculates an input signal that is fed to the control unit which, in turn, calculates the fault signal when the input signal remains below the reference value during the duration of the ignition measuring window. The input stage of one embodiment includes a rectifier which derives a DC or rectified signal from the filter signal, as well as including a switch that is driven by the control unit to connect the DC or rectified signal through to an integrator for the duration of the ignition measuring window. The integrator integrates the DC or rectified signal over the ignition window measuring to produce the input signal. A reset input of the integrator is driven by the control unit to select when the ignition measuring window has expired.

As set forth above, a knocking band-pass filter can be included to calculate a knocking signal from the sensor signal and supply the knocking signal to the rectifier. A switchover means is provided which is driven by the control unit which connects the sensor signal to the rectifier through either the knocking band-pass filter or the first band-pass filter.

When the control unit is a program-controlled processor system, it preferably includes an analog-to-digital converter at its input side to which the input signal is supplied. The control unit preferably compares the converted input signal to the reference value.

In an embodiment including a fault memory, at least one memory location is allocated to every cylinder of the internal combustion engine and the control unit is connected to increment the contents of the memory so that each faulty combustion results in a fault signal being recorded in the memory location that is allocated to the respective cylinder having the faulty combustion. The contents of the fault memory can then be read out for diagnosis of the internal combustion engine, and particularly for diagnosis of the cylinder experiencing faulty combustion. The control unit preferably shuts-off the injection of fuel for the cylinder which has had at least one fault signal. Following an injection pause, the control unit checks the effected cylinder with an intermediate injection and ignition. If a fault signal is detected in response to the intermediate injection, the control unit again shuts off the injection to that cylinder.

The warning light is preferably turned on by the control unit when at least one fault signal occurs and, in one embodiment, is turned on by the control unit when the control unit has shut off the injection of fuel into at least one of the cylinders in the internal combustion engine.

BRIEF DESCRIPTION OF THE DRAWINGS

FIG. 1 is a functional block diagram of an exemplary embodiment of an apparatus according to the principles of the present invention including a processor system control unit;

FIGS. 2a through 2h are time diagrams showing signals illustrating the functioning of the exemplary embodiment of FIG. 1; and FIG. 3 is a flow diagram of a program which schematically reproduces the sequence of recognition and evaluation of the filter signal by the control unit in the apparatus of the invention.

DESCRIPTION OF THE PREFERRED EMBODIMENTS

In FIG. 1 is shown an inventive means for carrying out a method of the invention, the means essentially comprising a sensor 1, a filter 2, an input stage 3, and a control unit 4.

The sensor 1, which is preferably a piezo-electric sensor, is secured to an internal combustion engine to sense the vibrations of the internal combustion engine and convert them into an electrical sensor signal SS. Other vibration sensors may, of course, be used instead. Connected at the output of the sensor 1 is an amplifier 8 for matching and amplifying the sensor signal SS.

The amplified signal SS is fed into the filter 2 which is composed of a first band-pass filter 21, a knocking band-pass filter 23, and a switchover means 22. The switchover means 22 connects the sensor signal SS either through to the knocking band-pass filter 23 or to the first band-pass filter 21, and is driven by a switchover signal on lead SU connected from the control unit 4. The first band-pass filter 21 has a center frequency $f_K$ corresponding to a frequency which is indicative of ignition and generates a filter signal SF from the sensor signal SS. The spectrum of the filter signal SS is characteristic for a normal combustion in an internal combustion engine. The knocking band-pass filter 23 has a center frequency $f_K$ corresponding to a frequency which is indicative of knocking and filters out a knocking signal SK from the sensor signal SS, the knocking signal SK being characteristic for high-speed knocking or for knocking due to pre-mature ignition.

Either the filter signal SF or the knocking signal SK are transmitted to the input stage 3 depending upon the position of the switch 22. The input stage 3 includes a full wave rectifier 31, a switch 32 and an integrator 33. The rectifier 31 generates a rectified signal SG, also referred to as a DC signal, from either the filter signal SF or from the knocking signal SK and supplies the rectified signal SG to the switch 32. The switch 32 switches the rectified signal SG to the integrator 33 only when a switching signal SSC is generated by the control unit 4 and transmitted to close the switch 32. When the integrator 33 receives the rectified signal SG, it integrates the through-connected rectified signal SG and thereby produces an input signal SE which is supplied to the control unit 4. The integrator 33 includes a reset input which is driven by a reset signal SR which also comes from the control unit 4.

The control unit 4 in the illustrated embodiment is a program-controlled processor system comprising a central processor unit 42, a read-only memory 43, a read/write memory 44, a timer 47, an analog-to-digital converter 41, and an input/output unit 45. All subunits of the control unit 4 are connected to one another by a system bus 46.

In addition to having a system clock generator, the time generator 47 also includes a timer which is set proceeding from the processor 42 to establish ignition measuring windows and knocking measuring windows. The system software is stored in the read-only memory (ROM) 43. The read/write memory 44 (RAM) serves to store current data. The control unit 4 is utilized not only for checking knocking and ignition events in the internal combustion engine but is mainly used for control of the internal combustion engine itself. Accordingly, the input/output unit 45 of the control means 4 has a greater number of control inputs and outputs then is required simply for performing the present method, the additional inputs and outputs being indicated by broken line arrows in FIG. 1. Among other things, the control unit 4 acts as a motor controller and also interprets the RPM of the internal combustion engine and, in particular, an idling RPM signal NO.

The control unit 4 controls a plurality of injection load circuits 7, only one of which is shown. The illustrated injection load circuit 7 includes, for example, a switching transistor Q for switching an injection valve 50 on and off. The input/output unit 45 also drives a warning lamp 5 for fault indication. The warning lamp 5 can be a simple dashboard indicator, or can be a more sophisticated diagnostic tool which reads out the contents of a fault memory 6 to accurately reflect the performance of the engine.

The fault memory 6 is connected to the input/output unit 45 and includes separate memory locations for each cylinder of the internal combustion engine. With every identified fault signal SFL, the memory location in the fault memory 6 which is allocated to the effected cylinder having a faulty combustion is incremented. The fault memory 6 is designed as a random access memory (RAM) having a refresh cycle in order to permanently receive the stored data.

Referring now to FIGS. 2a through 2h, the signal curves which occur in an exemplary embodiment of the apparatus are shown on a plurality of time graphs. In the chronological range wherein a combustion occurs in the internal combustion engine and a high pressure prevails in the cylinder, the sensor signal SS shown in FIG. 2a has an elevated signal amplitude that is noticeably distinguished from the other noises (vibrations) of the internal combustion engine. When the sensor signal SS is filtered, an allocated filter signal SF, as shown in FIG. 2b, or for the alternate switch position a knocking signal SK, as shown in FIG. 2c, is retrieved. Each of the illustrated signals SF and SK exhibit a region of elevated signal amplitude. As may be seen by comparing the signals of FIGS. 2b and 2c, the elevated signal amplitude of the knocking signal SK, which indicates an engine knock, occurs somewhat chronologically later than the elevated amplitude region of the filtered signal SF, which signifies the combustion event.

Accordingly, the filter signal SF has an ignition measure window TZ allocated to it during which significant signal amplitudes of the filter signal SF appear. The ignition measuring window TZ extends from a point in time of firing through about 10 degrees of rotation of the crank shaft angle. A knocking measuring window TK during which characteristic signal amplitudes of the knocking signal SK appear is situated following nearly immediately thereupon and is of a duration characteristic of engine knocking.

In FIG. 2d is shown the signal SG produced at the output of the rectifier 31. As shown, only the rectified signals SG in the measuring windows TZ and TK are connected to the integrator 33 as the result of the switching signal SSC shown in FIG. 2f which causes the switch 32 to close. The first curve SGa is being the rectified portion of the filter signal SF falling in the first measuring window TZ of FIG. 2b. The third curve SGc is the rectified filter signal SF in the second ignition measuring window TZ of FIG. 2b. The third curve SGc has a substantially lower amplitude than the first curve SGa as the result of a failed ignition in the cylinder during the second window TZ. The signal SGb is the rectified knocking signal SK which occurs in the first knocking window TK of FIG. 2c. The fourth signal curve SGd is the rectified knocking signal SK of the second knocking window TK and has a lower amplitude as the result of the absence of knocking.

The signals of FIG. 2d are integrated by the integrator 33 to produce the input signals SE shown in FIG. 2e. A threshold level a is exceeded when the area under the curves is greater than a predetermined value, thereby indicating ignition in the window TZ and knocking in the window TK.

FIGS. 2f and 2g show the curves of the switching signal SSC that is transmitted to the switch 32 by the control unit 4 and the reset signal SR that is transmitted to the integrator 33 by the control unit 4. FIG. 2h shows an identified fault signal SFL for transmittal to the memory 6.

The program steps for checking the internal combustion and the knocking of the internal combustion engine are shown generally in FIG. 3. After the program is started at least block 50, the control unit 4 first interrogates whether the internal combustion engine is running at the low idle speed by determining whether the low idle signal NO is present at least block 52. When the idle speed signal NO is not present indicating that the motor is not idling, the control unit 4 removes the switchover signal SU from the switch 22 via its input/output unit 45 wherewith the switchover unit 22 switches the sensor signal SS to the knocking band-pass filter 23 in the filter 2 so that the filter 23 is on at block 54. Further, the processor 42 sets the timer 47 which starts the knocking measuring window TK at block 56. Immediately thereupon, the control unit 4 outputs the switch signal SSC for switching on, or closing, the switch 32 at block 58. Further processing and evaluation of the knocking signal SK by the control unit 4 within the knocking measuring window TK is carried out by transfer to a known subprogram KNOCK, at block 60.

When the low idle speed signal NO is present at block 52, indicating that the internal combustion engine is idling, the control unit 4 forwards the switchover signal SU to the switchover means 22 in the filter 2 at block 62 so that the sensor signal SS is switched to the band-pass filter 21 to derive the filter signal SF. Immediately thereupon, the processor 42 sets the time generator 47 to start the ignition measuring window TZ at block 64 and outputs the switching signal SSC which turns on, or closes, the switch 32 at block 66. The rectified signal SG from the rectifier 31 is now applied to the integrator 33, and at the beginning of the ignition measuring window TZ, the integrator 33 begins to integrate up the rectified signal SG to form the input signal SE. The input signal SE, samples of which are shown if FIG. 2e, is forwarded to the analog-to-digital convertor 41 of the control unit 4 shown if FIG. 1.

The control unit 4 samples the input signal SE at equidistant chronological spacings for the duration of the ignition measuring window TZ and compares, at block 68, every sampled value of the input signal SE to a defined reference value a (shown in FIG. 2e). When the control unit 4 finds that the value of the input signal SE is higher than the reference value a at some point during the ignition measuring window TZ, a normal combustion has occurred. The control unit 4 retracts the switching signal SSC so that the switch 32 is opened, or turned off, as indicated by block 70 in FIG. 3. Immediately thereupon, the control unit 4 outputs the reset signal SR to the integrator 33 which is reset at block 72 in response thereto and the program returns to the start step at block 74.

When, by contrast, the sampled value of the input signal SE from the integrator 33 remains below the reference value a during the entire duration of the ignition measuring window TZ, as shown for example in the second window TZ of FIG. 2e, a regular combustion has not occurred. The decision is made at block 76 that the window TZ has ended. In response thereto, the control unit 4 calculates the faulty signal SFL as a binary data word which it outputs to the fault memory 6 at block 78. The memory location in the fault memory 6 which is allocated to the effected cylinder having a faulty combustion is then internally incremented. The control unit 4 drives, or turns on, the warning lamp 5 at block 80, preferably when a plurality of fault signals SFL have been identified or when a malfunction of at least one cylinder of the internal combustion engine has been identified.

To avoid further injection into the cylinder having faulty combustion, the control unit 4 switches off the respective injection load circuit 7 at block 82 for the effected cylinder via the allocated control channel. Injection of further fuel despite faulty combustion in the effected cylinder is thus reliably avoided. A wash-out, or flooding, with the resulting motor damage and an additional environmental pollution due to incomplete combustion of the fuel and damage to the exhaust catalyst are thereby avoided.

After the expiration of the ignition measuring window TZ and after identification of a fault signal SFL, the control unit 4 opens the switch 32 and resets the integrator 33 as before.

For function checking of a cylinder whose allocated injection load circuit 7 has been shut-off by the control unit 4, the control unit 4 executes an intermediate injection after the expiration of a defined injection pause. The control unit 4 switches the injection load circuit on and, after ignition has occurred, checks whether a regular combustion has occurred in the cylinder, for example, by using the steps of FIG. 3. The injection for the affected cylinder is again shut-off when the control unit 4 subsequently identifies a fault signal SFL. Otherwise, the cylinder is again fully used.

Although other modifications and changes may be suggested by those skilled in the art, it is the intention of the inventors to embody within the patent warranted hereon all changes and modifications as reasonably and properly come within the scope of their contribution to the art.

We claim:

1. A method for recognizing the difference between a faulty combustion condition and a normal combustion condition for any particular internal combustion engine wherein said faulty combustion condition comprises one of lack of combustion, incomplete combustion, combustion occurring outside a time frame intended for combustion for any preselected engine operating condition, and said normal combustion comprises lack of any of the aforementioned conditions, said method comprising:

sensing a frequency of vibration of the internal combustion engine using a sensor designed to output a sensor signal having spectrum components which are typical for a particular engine operating in said normal combustion condition;

passing said sensor signal through a bandpass filter which passes said typical spectrum components;

rectifying any signal portions passing through said bandpass filter to produce a rectified signal;

integrating said rectified signal during a period of time wherein the commencement of normal combustion occurs and ending said integration prior to a time during which knock may occur to produce an integrated signal;

comparing said integrated signal to a predetermined reference value for said particular engine; and outputting a fault signal when said integrated signal remains below said predetermined reference value.

2. A method as claimed in claim 1, further comprising the step of:

considering said rectified signal only during said period of time.

3. A method as claimed in claim 1, further comprising the step of:

considering and evaluating said rectified signal only during an absence of knocking of the internal combustion engine.

4. A method as claimed in claim 3, wherein said rectified signal is considered only during idling of the internal combustion engine.

5. A method as claimed in claim 2, further comprising the steps of:

beginning said period of time with the point in time of said normal combustion; and extending said period of time over a duration for a crank shaft of the engine to rotate through an angle of approximately 10 degrees.

6. An apparatus for recognizing the difference between a faulty combustion condition and a normal combustion condition for any particular internal combustion engine wherein said faulty combustion condition comprises one of lack of combustion, incomplete combustion, combustion occurring outside a time frame intended for combustion for any preselected engine operating condition, and said normal combustion comprises lack of any of the aforementioned conditions, comprising:

at least one sensor secured to the internal combustion engine, said at least one sensor designed to output a sensor signal having spectrum components which are typical for a particular engine operating in said normal combustion condition;

a band pass filter being connected to said sensor to pass said typical spectrum components;

an input stage connected to an output of said band pass filter to receive any signal from said band pass filter and form an input signal therefrom; and a control unit connected to receive said input signal, said control unit outputting a fault signal when said input signal remains below a reference value during a period of time wherein the commencement of normal combustion occurs and ending prior to a time during which knock may occur.

7. An apparatus as claimed in claim 6, further comprising:

an amplifier connected at an output of said at least one sensor to amplify said sensor signal.

8. An apparatus as claimed in claim 6, wherein said control unit has an output on which is emitted a switch signal during said period of time, and wherein said input stage includes:

a rectifier connected to an output of said band pass filter to rectify any signals passed through said band pass filter and thereby form a rectified signal;

a switch connected to receive said switch signal from said control unit and connected to switch though said rectified signal for a duration of said period of time in response to said switch signal; and an integrator being connected to receive said rectified signal switched through by said switch, said integrator integrating said rectified signal to calculate said input signal, said integrator having a reset input connected to said control unit for selection when said period of time has expired.

9. An apparatus as claimed in claim 8, wherein said band pass filter is a first band pass filter, and further comprising:

a knocking band-pass filter connected to receive said sensor signal to pass a knocking signal, said knocking band-pass filter connected to supply said knocking signal to said rectifier; and a switchover means for connecting said sensor signal through to said rectifier via one of said knocking band-pass filter and said first band-pass filter, said switchover means being driven by said control unit.

10. An apparatus as claimed in claim 6, wherein said control unit is a program-controlled processor system including:

an analog-to-digital converter at an input side to which said input signal is supplied, and said control unit being operable to compare a converted input signal to a reference value.

11. An apparatus as claimed in claim 10, further comprising:

a fault memory having at least one memory location allocated to every cylinder of the internal combustion engine;

said control unit being connected to said fault memory to increment contents of a corresponding one of said memory locations with every fault signal that is allocated to a respective cylinder having faulty combustion; and means for reading out the contents of said fault memory for diagnosis of the internal combustion engine.

12. An apparatus as claimed in claim 11, wherein said control unit is connected to shut-off injection of fuel for a cylinder for which at least one fault signal has been identified.

13. An apparatus as claimed in claim 12, wherein said control unit is connected to check an affected cylinder with an intermediate injection and ignition following an injection pause and again shuts off the ignition when said control unit determines a fault signal in response to said intermediate injection.

14. An apparatus as claimed in claim 12, further comprising:

a warning lamp connected to said control unit to provide an indication when at least one fault signal occurs.

15. An apparatus as claimed in claim 12, further comprising:

a warning lamp connected to said control unit to provide an indication when said control unit has shut-off injection of fuel into at least one cylinder of the internal combustion engine.

* * * * *